United States Patent
Yoon et al.

(10) Patent No.: US 10,586,987 B2
(45) Date of Patent: Mar. 10, 2020

(54) ACRYLIC BINDER FOR LITHIUM-SULFUR SECONDARY BATTERY CATHODE

(71) Applicant: LG Chem, Ltd., Seoul (KR)

(72) Inventors: Jeong Ae Yoon, Daejeon (KR); Charles Kiseok Song, Daejeon (KR); Ki Young Kwon, Daejeon (KR); Sung Soo Yoon, Daejeon (KR); Han Na Chi, Daejeon (KR); Doo Kyung Yang, Daejeon (KR)

(73) Assignee: LG Chem, Ltd. (KR)

( * ) Notice: Subject to any disclaimer, the term of this patent is extended or adjusted under 35 U.S.C. 154(b) by 1 day.

(21) Appl. No.: 15/571,308

(22) PCT Filed: Oct. 26, 2016

(86) PCT No.: PCT/KR2016/012060
§ 371 (c)(1),
(2) Date: Nov. 2, 2017

(87) PCT Pub. No.: WO2017/074004
PCT Pub. Date: May 4, 2017

(65) Prior Publication Data
US 2018/0114988 A1 Apr. 26, 2018

(30) Foreign Application Priority Data
Oct. 29, 2015 (KR) .................. 10-2015-0151132

(51) Int. Cl.
| | | |
|---|---|---|
| *H01M 4/62* | (2006.01) | |
| *H01M 4/38* | (2006.01) | |
| *H01M 4/13* | (2010.01) | |
| *H01M 4/136* | (2010.01) | |
| *H01M 10/0525* | (2010.01) | |
| *C08F 22/22* | (2006.01) | |
| *H01M 10/056* | (2010.01) | |
| *C08F 22/36* | (2006.01) | |
| *C08F 22/10* | (2006.01) | |
| *C08F 22/30* | (2006.01) | |
| *H01M 4/36* | (2006.01) | |
| *H01M 4/583* | (2010.01) | |
| *H01M 10/052* | (2010.01) | |
| *H01M 4/02* | (2006.01) | |

(52) U.S. Cl.
CPC .......... *H01M 4/622* (2013.01); *C08F 22/105* (2013.01); *C08F 22/22* (2013.01); *C08F 22/30* (2013.01); *C08F 22/36* (2013.01); *H01M 4/13* (2013.01); *H01M 4/136* (2013.01); *H01M 4/364* (2013.01); *H01M 4/38* (2013.01); *H01M 4/382* (2013.01); *H01M 4/583* (2013.01); *H01M 4/621* (2013.01); *H01M 4/625* (2013.01); *H01M 10/056* (2013.01); *H01M 10/0525* (2013.01); *H01M 10/052* (2013.01); *H01M 2004/028* (2013.01)

(58) Field of Classification Search
CPC .... H01M 10/052; H01M 10/056; H01M 4/13; H01M 4/621; H01M 4/622; C08F 22/105; C08F 22/30; C08F 22/36; C08F 22/22
USPC ................... 429/217; 522/182; 528/363
See application file for complete search history.

(56) References Cited

U.S. PATENT DOCUMENTS

| | | | | |
|---|---|---|---|---|
| 4,886,852 | A * | 12/1989 | Numa ...................... | C08F 2/08 524/458 |
| 5,356,996 | A * | 10/1994 | Nakao ..................... | C08L 61/20 525/158 |
| 5,459,010 | A | 10/1995 | Shimizu et al. | |
| 2002/0039680 | A1 | 4/2002 | Hwang et al. | |
| 2003/0073000 | A1 | 4/2003 | Lee et al. | |
| 2004/0029014 | A1 | 2/2004 | Hwang et al. | |
| 2004/0048154 | A1 | 3/2004 | Jung et al. | |
| 2004/0058246 | A1 | 3/2004 | Choi et al. | |
| 2011/0287305 | A1 | 11/2011 | Scordilis-Kelley et al. | |
| 2012/0128743 | A1* | 5/2012 | Hawkett .................. | C08F 2/20 424/401 |
| 2012/0330589 | A1 | 12/2012 | Ryu et al. | |
| 2013/0309572 | A1 | 11/2013 | Zhang et al. | |
| 2014/0039122 | A1* | 2/2014 | Mestach .................. | C08F 2/26 524/745 |
| 2014/0272574 | A1 | 9/2014 | Son et al. | |
| 2015/0119536 | A1 | 4/2015 | Liu | |
| 2015/0200398 | A1 | 7/2015 | Yeou et al. | |
| 2015/0221935 | A1 | 8/2015 | Zhou et al. | |
| 2016/0137766 | A1* | 5/2016 | Okafuji ..................... | C08J 5/18 428/337 |

FOREIGN PATENT DOCUMENTS

| | | |
|---|---|---|
| EP | 0522457 A1 | 1/1993 |
| EP | 3168910 A1 | 5/2017 |
| JP | 2002110237 A | 4/2002 |
| JP | 2003123739 A | 4/2003 |
| JP | 2004071566 A | 3/2004 |

(Continued)

OTHER PUBLICATIONS

Search report from International Application No. PCT/KR2016/012060, dated Jan. 31, 2017.

(Continued)

*Primary Examiner* — Amanda C. Walke
(74) *Attorney, Agent, or Firm* — Lerner, David, Littenberg, Krumholz & Mentlik, LLP

(57) ABSTRACT

The present invention relates to a binder for a lithium-sulfur secondary battery cathode, and a composition containing the same. The binder of the present application enables a cathode active material electrolyte to have excellent resistance.

19 Claims, No Drawings

(56) References Cited

FOREIGN PATENT DOCUMENTS

| | | |
|---|---|---|
| JP | 2004103548 A | 4/2004 |
| JP | 2004119367 A | 4/2004 |
| JP | 2008537841 A | 9/2008 |
| JP | 2010174058 A | 8/2010 |
| JP | 2013525543 A | 6/2013 |
| JP | 2014518001 A | 7/2014 |
| KR | 20020048447 A | 6/2002 |
| KR | 20140073936 A | 6/2014 |
| KR | 20150083724 A | 7/2015 |
| WO | 2018056782 A1 | 3/2018 |

OTHER PUBLICATIONS

Extended European Search Report including the Written Opinion for Application No. EP 16860187.0 dated May 20, 2019, 8 pages.

\* cited by examiner

ACRYLIC BINDER FOR LITHIUM-SULFUR SECONDARY BATTERY CATHODE

CROSS-REFERENCE TO RELATED APPLICATIONS

The present application is a national phase entry under 35 U.S.C. § 371 of International Application No. PCT/KR2016/012060 filed on Oct. 26, 2016, which claims priority from Korean Patent Application No. 10-2015-0151132 filed on Oct. 29, 2015, the disclosures of which are incorporated herein by reference.

TECHNICAL FIELD

The present invention relates to an acrylic binder for a lithium-sulfur secondary battery cathode, a composition thereof, a lithium-sulfur secondary battery cathode and a use thereof.

BACKGROUND ART

As the application area of the secondary battery is extended to the electric vehicle (EV) or the energy storage system (ESS), and the like, the lithium-ion secondary battery has reached a limit situation with a relatively low weight ratio energy storage density (~250 Wh/kg).

Among the next generation secondary battery technologies capable of achieving high energy density, lithium-sulfur secondary batteries are attracting attention as high commercialization potential compared to other technologies.

The lithium-sulfur secondary battery means a battery system using sulfur as a cathode active material and lithium metal as an anode active material.

When the lithium-sulfur secondary battery is discharged, sulfur in the cathode receives electrons and is reduced, and lithium in the anode is oxidized and ionized. The sulfur reduction reaction is a process in which a sulfur-sulfur (S—S) bond accepts two electrons and converts to a sulfur anion form, where lithium ions formed by oxidation are transferred to the cathode through an electrolyte to form a salt with the ionized sulfur.

The sulfur prior to discharge has a cyclic $S_8$ structure and is converted into lithium polysulfide ($LiS_x$) by a reduction reaction, where the lithium polysulfide ($LiS_x$) is reduced in a stepwise fashion and finally becomes lithium sulfide ($Li_2S$).

The theoretical energy density through such an electrochemical reaction is 2,500 Wh/kg, which is 10 times higher than that of lithium ion batteries.

Despite such an advantage of the lithium-sulfur secondary battery, there are many problems such as high solubility of lithium polysulfide, low lifetime characteristics and output characteristics, low electrical conductivity of sulfur, and poor stability due to the use of lithium metal.

In one example, the lithium polysulfide (LiSx) easily dissolves in the electrolyte, so that the loss of active sulfur due to repetitive charging and discharging and the resulting deterioration of cycle characteristics are considered as the biggest challenge to be solved in the lithium-sulfur secondary battery.

In order to solve the above problems, a technique of manufacturing an electrode as a porous body and then supporting sulfur within the porous bodies to inhibit dissolution possibility for the electrolyte, a technique of introducing a substance capable of adsorbing polysulfide into the electrode or a technique utilizing the hydrophilic property of polysulfide, and the like have been proposed.

However, there is still a need for continuous research on the lithium-sulfur secondary battery having excellent electrochemical performances while effectively preventing the undesired dissolution of lithium polysulfide ($LiS_x$)

DISCLOSURE

Technical Problem

The present application provides an acrylic binder for a lithium-sulfur secondary battery cathode having excellent cycle characteristics by effectively preventing the dissolution of a cathode active material.

In addition, the present application provides a composition for forming an active layer of a cathode for a lithium-sulfur secondary battery maintaining a secondary structure of a conductive material and having excellent electrochemical performances.

Furthermore, the present application provides a cathode for a lithium-sulfur secondary battery having an active layer comprising such an acrylic binder, and a secondary battery comprising the same.

Technical Solution

The present invention relates to a binder for a lithium-sulfur secondary battery cathode, and a composition comprising the same.

The binder for a lithium-sulfur secondary battery cathode according to the present application may comprise a polymerized unit of a monomer within the binder which interacts with a cathode active material and effectively prevents the dissolution of a cathode active material, specifically lithium polysulfide ($LiS_x$), which is formed by the reduction of sulfur in the cathode, into an electrolyte.

In addition, the present invention provides an acrylic binder with superior conductive material dispersability which allows using a larger amount of conductive materials in the composition for the preparation of active layer and therefore obtaining better electrochemical properties.

The term "acrylic binder" in the present application means a polymer containing at least 30% by weight of polymerized units of an acrylic monomer and serving as a binder of the secondary battery. Here, the acrylic monomer means acrylic acid, methacrylic acid or a derivative thereof.

That is, the acrylic binder of the present application is included in the active layer of the lithium-sulfur secondary battery cathode to perform a role in binding the cathode active material, the conductive material, and other materials contained in the active layer.

The acrylic binder comprises polymerized units of a polymerizable monomer having a polar functional group interacting with the cathode active material.

The term "polymerized unit of a given compound" in the present application may mean a state in which the given compound is polymerized in a skeleton such as a side chain or a main chain of a polymer formed by polymerizing the given compound.

In the present application, it can be understood that the interaction between the polar functional group and the cathode active material comprises all known physical or chemical interactions that can prevent the dissolution of lithium polysulfide ($LiS_x$).

In one example, the interaction of the polar functional group with the cathode active material may be, but is not limited to, an interaction between the polar functional group and the sulfur element, i.e., the dipole-dipole moment.

Through such an interaction between the cathode active material of the lithium-sulfur secondary battery and the polar functional group in the acrylic binder, it is possible to effectively prevent the dissolution of lithium polysulfide ($LiS_x$), which is formed by the reducing of sulfur in the cathode, into the electrolyte.

The polar functional group may be utilized without limitation as long as the above-described objects can be achieved, but may be, for example, one or more selected from a nitrogen-containing functional group, an alkylene oxide group, a hydroxy group and an alkoxysilyl group.

That is, the polar functional group according to the present application may be any one selected from the group consisting of a nitrogen-containing functional group, an alkylene oxide group, a hydroxyl group and an alkoxysilyl group.

The term "nitrogen-containing functional group" in the present application is a functional group containing nitrogen in the molecule, and for example, can be exemplified by an amine group, an imine group, an amide group, a nitrile group, a nitro group, an azo group, an imide group or an azide group, but is not limited thereto.

In one example, the polymerizable monomer having a polar functional group can be exemplified by a polymerizable monomer having a nitrogen-containing functional group such as (meth)acrylonitrile, (meth)acrylamide, N-methylacrylamide, N,N-dimethyl (meth)acrylamide, N-butoxymethyl(meth)acrylamide, N-vinylpyrrolidone, N-vinylcaprolactam, 2-aminoethyl (meth)acrylate, 3-aminoethyl (meth)acrylate, N,N-dimethylaminoethyl (meth)acrylate or N,N-dimethylaminopropyl (meth)acrylate; a polymerizable monomer having an alkylene oxide group such as alkoxyalkyleneglycol (meth)acrylic acid ester, alkoxydialkyleneglycol (meth)acrylic acid ester or alkoxypolyethyleneglycol (meth)acrylic acid ester; a polymerizable monomer having a hydroxy group such as hydroxyalkyl (meth)acrylate, for example, 2-hydroxyethyl (met)acrylate, 2-hydroxypropyl (meth)acrylate, 4-hydroxybutyl (meth) acrylate, 6-hydroxyhexyl (meth)acrylate, 6-hydroxyhexyl (met)acrylate or 8-hydroxyoxyl (meth)acrylate, or hydroxypolyalkyleneglycol (meth)acrylate, for example, hydroxypolyethyleneglycol (meth)acrylate or hydroxypolypropyleneglycol (meth)acrylate; or a polymerizable monomer having an alkoxysilyl group such as 3-(trimethoxysilyl) propyl (meth)acrylate or 3-(triethoxysilyl)propyl (meth) acrylate, and the like, but is not limited thereto. Here, (meth)acrylate may mean acrylate or methacrylate.

Such a polymerizable monomer having a polar functional group may be contained in the binder in a polymerized unit ratio of 30 to 100 parts by weight. In another example, the polymerizable monomer having a polar functional group may be contained in the binder in a polymerized unit ratio of 40 to 100 parts by weight, 50 to 100 parts by weight, 60 to 100 parts by weight, 70 to 100 parts by weight, or 80 to 100 parts by weight.

In the present application, the term "part by weight" may mean a weight ratio between the respective components, unless otherwise specified.

The polar functional group in the acrylic binder of the present application interacts with the cathode active material of the lithium-sulfur secondary battery. The interaction has a meaning including all known physical or chemical interactions, as described above, and specifically, may be an interaction between the polar functional group and the sulfur element.

The cathode active material is usually included in the cathode active layer of the lithium-sulfur secondary battery, and may have, for example, a compound comprising the sulfur element. The compound comprising the sulfur element may be, for example, a cyclic structure compound comprising eight sulfur atoms.

In the lithium-sulfur secondary battery, the compound comprising the sulfur element may have dissolution characteristics into an electrolyte due to the repetitive charge-discharge mechanism and also cause electrochemical problems due to low electric conductivity, and thus may exist in a state forming a composite with a material capable of improving such properties.

In one example, the cathode active material may be a sulfur-carbon composite.

The sulfur-carbon composite may be formed by applying a compound comprising the sulfur element to porous carbon, or by melting the compound and mixing it with carbon. At this time, the content ratio of carbon and sulfur in the sulfur-carbon composite may be, for example, in a ratio of 5:95 to 50:50, but is not limited thereto.

The carbon may be crystalline or amorphous carbon, which is not limited as long as it is conductive carbon, and may be, for example, graphite, carbon black, active carbon fiber, inactive nanofiber, carbon nanotube or carbon fabric, and the like.

The acrylic binder of the present application may further comprise a polymerized unit of an acrylic monomer, specifically alkyl (meth)acrylate, in order to control the weight average molecular weight and the glass transition temperature.

In one example, the alkyl (meth)acrylate is (meth)acrylate having 1 to 20 carbon atoms, which can be exemplified by methyl (meth)acrylate, ethyl (meth)acrylate, n-propyl (meth)acrylate, isopropyl (meth)acrylate, n-butyl (meth) acrylate, t-butyl (meth)acrylate, isobutyl (meth)acrylate, 2-ethylhexyl (met)acrylate, 2-ethylbutyl (meth)acrylate, pentyl (meth)acrylate, hexyl (meth)acrylate, cyclohexyl (meth)acrylate, n-octyl (meth)acrylate, isooctyl (meth)acrylate, isononyl (meth)acrylate, decyl (meth)acrylate, dodecyl (meth)acrylate, tridecyl (meth)acrylate, tetradecyl (meth) acrylate, octadecyl (meth)acrylate or isobornyl (meth)acrylate, and the like, but is not limited thereto.

This alkyl (meth)acrylate may be contained in the binder in a polymerized unit ratio of 5 to 30 parts by weight.

The acrylic binder according to the present application can be prepared in various ways.

For example, the acrylic binder may be prepared by utilizing a method such as known solution polymerization, bulk polymerization, suspension polymerization or emulsion polymerization for the above-described polymerizable monomer having a polar functional group interacting with a cathode active material, either alone or after blending it with alkyl (meth)acrylate in an appropriate ratio.

In one example, in the case of producing the acrylic binder by the solution polymerization method, the binder exhibits a particle diameter of 10 nm or less, may have more excellent adhesion force, and may also increase the content of the conductive material in the composition to secure electrochemical excellence.

In one example, in the case of producing the acrylic binder by the solution polymerization, the particle size of the acrylic binder can be adjusted to a range of 10 nm or less, whereby an appropriate peeling force to the current collector and excellent dispersibility to the conductive material can be achieved. The particle size of the acrylic binder may be measured using, for example, dynamic light scattering (DLS) equipment.

The solvent used for the solution polymerization of the acrylic binder is not particularly limited, but may be, preferably, a solvent having a boiling point of 110° C. or lower in order to use the solution as such without further purification process after solution polymerization. Such a solvent includes, for example, acetone, methanol, ethanol, acetonitrile, isopropanol, methyl ethyl ketone or water, and the like.

The acrylic binder of the present application may have a glass transition temperature in a range of −80° C. to 50° C. In such a glass transition temperature range, appropriate adhesiveness with the current collector can be secured, and retention capability for the conductive material, and the like, and resistance to the electrolyte can also be advantageously secured.

The acrylic binder of the present application may also have a weight average molecular weight ranging from 5,000 to 1,000,000. In the present application, the term weight average molecular weight may mean a value converted to those of standard polystyrenes measured by GPC (Gel Permeation Chromatograph), and unless otherwise specified, the molecular weight of any polymer may mean the weight average molecular weight of the polymer.

Also, the acrylic binder may further comprise polymerized units of other non-acrylic monomers to achieve the aforementioned glass transition temperature or weight average molecular weight. The non-acrylic monomer means a polymerizable monomer other than an acrylic monomer, and may be, for example, a vinyl monomer, and the like.

The present application also relates to a composition for forming a cathode active layer of a lithium-sulfur secondary battery comprising the acrylic binder.

The composition according to the present application can be utilized in forming a cathode active layer for a lithium-sulfur secondary battery which effectively prevents the dissolution of lithium polysulfide ($LiS_x$) to represent excellent cycle characteristics and secures the electrochemical characteristics by excellent dispersion characteristics of the conductive material in the composition.

In one example, the composition for forming a cathode active layer of a lithium-sulfur secondary battery according to the present application comprises the acrylic binder, the cathode active material and the conductive material, as described above.

As described above, the acrylic binder contained in the composition of the present invention comprises polymerized units of a polymerizable monomer having a polar functional group interacting with the cathode active material, and for example, may be contained in the composition in a ratio of 0.01 to 10 parts by weight, relative to 100 parts by weight of the solid content of the composition. In such a range, it is possible to secure desired binding properties, to effectively prevent the dissolution phenomenon of lithium polysulfide ($LiS_x$), and to secure the dispersion characteristics for the conductive material.

As described above, the cathode active material has a compound comprising a sulfur element, and specifically, may be a sulfur-carbon composite. Also, the sulfur-carbon composite may be formed by applying a compound containing a sulfur element to porous carbon, or by melting the compound and mixing it with carbon. At this time, the content ratio of carbon and sulfur in the sulfur-carbon composite may be, for example, in a ratio of 5:95 to 50:50 on the basis of mass. As the kind of carbon, the above-described graphite, and the like can also be adopted and used without limitation.

Such a cathode active material may be contained in the composition in a ratio of 30 to 95 parts by weight, relative to 100 parts by weight of the solid content of the composition, but is not limited thereto, and the range may be appropriately changed in consideration of the performance of the desired battery.

The composition of the present application comprises a conductive material. In the lithium-sulfur secondary battery, in order to overcome the problem due to the low electrical conductivity of sulfur, the conductive material should be included in the active material, but when the amount of the conductive material is excessively large, an aggregation phenomenon of the conductive material may also occur due to deterioration of the dispersion characteristics and the energy density of the entire battery may also be lowered.

By comprising the acrylic binder having excellent dispersibility to the conductive material, the composition of the present application may comprise the conductive material in an amount within the range that does not lower the energy density of the entire battery while the aggregation phenomenon of the conductive material does not occur.

In one example, the conductive material may be included in the composition in a ratio of 2 to 70 parts by weight, 10 to 70 parts by weight, 15 to 70 parts by weight or 18 to 70 parts by weight, relative to 100 parts by weight of the solid content of the composition.

In one example, as the conductive material, graphite such as natural graphite or artificial graphite; carbon black such as carbon black, acetylene black, Ketjen black, panel black, furnace black, lamp black, and summer black; conductive fibers such as carbon fibers or metal fibers; metal powders such as carbon fluoride, aluminum, and nickel powders; a conductive whisker such as zinc oxide and potassium titanate; a conductive metal oxide such as titanium oxide; or a conductive material such as polyaniline, polythiophene, polyacetylene, polypyrrole, or a polyphenylene derivative, and the like can be used, without being limited thereto.

As the conductive material, for example, one having a particle diameter of 40 nm or less and a surface area of 1,000 $m^2/g$ or more can be used, without being limited thereto.

The composition of the present application may further comprise a non-acrylic binder in addition to the above-mentioned components. The non-acrylic binder may be one which plays a role in attaching the cathode active material to the current collector to be capable of further imparting resistance to dissolution for the electrolyte.

In one example, the non-acrylic binder may be a fluororesin binder including polyvinylidene fluoride (PVDF) or polytetrafluoroethylene (PTFE), and the like; a rubber binder including styrene-butadiene rubber, acrylonitrile-butadiene rubber or styrene-isoprene rubber, and the like; a cellulose binder including carboxymethyl cellulose (CMC), starch, hydroxypropyl cellulose or regenerated cellulose, and the like; a polyalcohol binder; a polyolefin binder including polyethylene or polypropylene, and the like; a polyimide binder; a polyester binder; or a silane binder, and the like, but is not limited thereto.

The non-acrylic binder may be included in the composition in a ratio of, for example, 0 to 20 parts by weight, relative to 100 parts by weight of the solid content of the composition.

Also, the composition may further comprise a solvent.

The type of the solvent can be appropriately set in consideration of the intended performance and the like, and for example, an organic solvent such as N-methyl-2-pyrrolidone, methanol, ethanol, propylene carbonate, ethylene carbonate, butylenes carbonate, dimethyl carbonate, diethyl carbonate, gamma-butylolactone, 1,2-dimethoxyethane, tetrahydrofuran, 2-methyltetrahydrofuran, dimethylsulfoxide, formamide, dimethylformamide, acetonitrile, nitromethane, methyl formate, methyl acetate, phosphoric acid triester, trimethoxymethane, sulfolane, methylsulfolane, 1,3-dimethyl-2-imidazolidinone, a propylene carbonate derivative, a tetrahydrofuran derivative, methyl propionate or ethyl propionate, or water can be used, but water is preferred in consideration of the drying temperature or environmental effects.

The ratio of the solvent contained in the composition can be suitably selected in consideration of the desired coating property and the like.

Furthermore, various known additives may be further included in the composition for forming the cathode active layer of the lithium-sulfur secondary battery.

In one example, the additive may be one or more selected from transition metal elements, IIIA group elements, IVA group elements, sulfur compounds of these elements, and sulfur alloys of these elements.

As the transition metal element, for example, Sc, Ti, V, Cr, Mn, Fe, Co, Ni, Cu, Zn, Y, Zr, Nb, Mo, Tc, Ru, Rg, Pd, Au or Hg, and the like can be included, as the IIIA group element, for example, Al, Ga, In or Ti, and the like can be included, and as the IVA group element, Ge, Sn or Pb, and the like can be included.

The present application also relates to a cathode for a lithium-sulfur secondary battery.

The cathode of the present application comprises a current collector and an active layer. The active layer is formed using the above-described composition for forming an active layer, and comprises an acrylic binder.

That is, the cathode for the lithium-sulfur secondary battery of the present application has a current collector; and an active layer formed on the current collector and comprising an acrylic binder. In addition, the acrylic binder comprises polymerized units of a polymerizable monomer having a polar functional group interacting with the cathode active material.

In the present application, the current collector may be selected without particular limitation as long as it is generally used in a cathode for a lithium-sulfur secondary battery.

As the current collector, for example, stainless steel, aluminum, nickel, titanium, calcined carbon or aluminum, and the like can be used, and if necessary, the surface of the stainless steel or the like may be subjected to surface treatment using carbon, nickel, titanium or silver.

If necessary, fine irregularities may be formed on the surface of the current collector, and such irregularities can help improve the adhesion force with the active layer. When the surface of the current collector is subjected to roughening, the method is not particularly limited, and for example, a known method such as mechanical polishing, electrolytic polishing or chemical polishing methods can be applied.

The current collector may have, for example, various forms such as films, sheets, foils, nets, porous bodies, foams or nonwoven fabrics.

The thickness of the current collector is not particularly limited and may be set in an appropriate range in consideration of the mechanical strength of the cathode, productivity, capacity of the battery, and the like.

The cathode for a lithium-sulfur secondary battery has an active layer formed on the current collector. The active layer can be formed using the above-described composition.

In one example, the active layer may be formed on the current collector by applying a composition for forming an active layer comprising an acrylic binder, a cathode active material, a conductive material and other additives on the current collector using a known application method, followed by the drying process, and the like.

As the application process, any known application method including, for example, a bar coating method, a screen coating method, a doctor blade method, a dipping method, a reverse roll method, a direct roll method, a gravure method or an extrusion method, and the like can be applied thereto without limitation.

Also, the application amount of the composition for the active layer composition of the present application on the current collector is not particularly limited and for example, may be adjusted within a range in which an active layer with a desired thickness can be finally formed.

Furthermore, known processes required for the production of the cathode before or after the process of forming the active layer, for example, a rolling or drying process, and the like can be carried out, if necessary.

The active layer may have, for example, a thickness in a range of 1 to 200 µm, 20 to 200 µm, or 30 to 200 µm, without being thereto, and the thickness range may be changed in consideration of the desired performance and the like.

The present application also relates to a lithium-sulfur secondary battery comprising such a cathode for a lithium-sulfur secondary battery.

The lithium-sulfur secondary battery may comprise an anode comprising lithium metal or a lithium alloy as an anode active material; a cathode comprising the current collector and the active layer, as described above; a separator positioned between the cathode and the anode; and an electrolyte impregnating the anode, the cathode and the separator, and comprising a lithium salt and an organic solvent.

The lithium alloy of the anode active material is an alloy of lithium and a metal selected from the group consisting of Na, K, Rb, Cs, Fr, Be, Mg, Ca, Sr, Ba, Ra, Al and Sn, but is not limited thereto.

The separator positioned between the cathode and the anode separates or insulates the cathode and the anode from each other and permits transport of lithium ions between the cathode and the anode, which may be composed of a porous nonconductive or insulating material. Such a separator may also be an independent member such as a film, or may also be a coating layer added to the cathode and/or the anode.

The material of the separator includes, but is not limited to, for example, polyolefin such as polyethylene and polypropylene, a glass fiber filter paper, and a ceramic material, and its thickness may be about 5 to about 50 µm, specifically about 5 to about 25 µm.

The electrolyte impregnating the anode, the cathode and the separator comprises a lithium salt and an organic solvent.

The lithium salt may have a concentration of about 0.2 to 2.0 M, depending on various factors such as the precise composition of the electrolyte solvent mixture, the solubility of the salt, the conductivity of the dissolved salt, the charge and discharge conditions of the battery, the operating temperature and other factors known in the lithium battery field. As an example of the lithium salt for use in the present application, one or more selected from the group consisting of LiSCN, LiBr, LiI, $LiPF_6$, $LiBF_4$, $LiSO_3CF_3$, $LiClO_4$, $LiSO_3CH_3$, $LiB(Ph)_4$, $LiC(SO_2CF_3)_3$ and $LiN(SO_2CF_3)_2$ may be included.

As the organic solvent, a single solvent or two or more mixed organic solvents may also be used. When two or more mixed organic solvents are used, it is preferred to select at least one solvent from two or more groups among a weak polar solvent group, a strong polar solvent group, and a lithium metal protective solvent group.

The weak polar solvent is defined as a solvent having a dielectric constant of less than 15 which is capable of dissolving a sulfur element among an aryl compound, a bicyclic ether and an acyclic carbonate, and the strong polar solvent is defined as a solvent having a dielectric constant of more than 15 which is capable of dissolving lithium polysulfide among a bicyclic carbonate, a sulfoxide compound, a lactone compound, a ketone compound, an ester compound, a sulfate compound, and a sulfite compound, and the lithium metal protective solvent is defined as a solvent having a charge-discharge cycle efficiency of 50% or more, which forms a stable SEI (solid electrolyte interface) on lithium metal, such as a saturated ether compound, an unsaturated ether compound, and a heterocyclic compound comprising N, O, S or a combination thereof.

A specific example of the weak polar solvent includes xylene, dimethoxyethane, 2-methyltetrahydrofuran, diethyl carbonate, dimethyl carbonate, toluene, dimethyl ether, diethyl ether, diglyme or tetraglyme, and the like.

A specific example of the strong polar solvent includes hexamethyl phosphoric triamide, γ-butyrolactone, acetonitrile, ethylene carbonate, propylene carbonate, N-methylpyrrolidone, 3-methyl-2-oxazolidone, dimethylformamide, sulfolane, dimethylacetamide, dimethylsulfoxide, dimethylsulfate, ethylene glycol diacetate, dimethylsulfite or ethylene glycol sulfite, and the like.

A specific example of the lithium protective solvent includes tetrahydrofuran, ethylene oxide, dioxolane, 3,5-dimethylisoxazole, furan, 2-methylfuran, 1,4-oxane or 4-methyldioxolane, and the like.

The present application also provides a battery module comprising the lithium-sulfur secondary battery as a unit cell.

The battery module may be specifically used as a power source for an electric vehicle, a hybrid electric vehicle, a plug-in hybrid electric vehicle or an energy storage system.

Advantageous Effects

The present application can provide an acrylic binder contained in a cathode active layer of a lithium-sulfur secondary battery, which can effectively prevent dissolution of a cathode active material and ultimately ensure excellent cycle characteristics, and a composition comprising the same.

Also, the present application can provide a composition for forming a cathode active layer of a lithium-sulfur secondary battery, which can comprise an appropriate amount of a conductive material by having excellent dispersion characteristics, and a cathode comprising the active layer formed therefrom.

BEST MODE

Hereinafter, the present invention will be described with reference to examples thereof, but the following examples are intended to illustrate the present application, and it is apparent to those having ordinary skill in the art that the scope of the present application is not limited by the following examples.

The physical properties shown in these examples and comparative examples were evaluated in the following manner.

[1. Method of Measuring Conversion Rate of Binder]
Analysis Equipment
Gas chromatography (PerkinElmer)
Analysis Conditions
Solvent: Tetrahydrofuran
Initial temperature: 3 minutes at 50, Ramp: 30/min at 200
Injection volume: 0.5 µl
Analysis Procedure The reaction product is diluted in a solvent at a concentration of 20 mg/mL and 5 mg/mL of toluene is added as a standard substance, and then the gas chromatography is measured. The conversion rate is calculated by the ratio change of the monomer peak size, relative to the toluene peak.

Conversion rate (%)=$(A_{ini}-A_{fin})/A_{ini} \times 100$ $A_{ini}$: an area relative ratio of the monomer peak at the start of the reaction, relative to the toluene peak $A_{fin}$: an area relative ratio of the monomer peak at the end of the reaction, relative to the toluene peak

[2. Evaluation of Molecular Weight of Binder]

A weight average molecular weight (Mw) and molecular weight distribution (PDI) were measured using GPC under the following conditions, and the measurement results were converted by using standard polystyrene of the Agilent system in production of calibration curves.

<Measurement Conditions>

Measuring instrument: Agilent GPC (Agilent 1200 series, U.S.)
Column: Two PL Mixed B connected
Column temperature: 40° C.
Eluent: tetrahydrofuran or N,N-dimethylformaldehyde
Flow rate: 1.0 mL/min
Concentration: ~1 mg/mL (100 µl injection)

[3. Formation of Cathode Active Layer]

A carbon-sulfur composite was obtained through a wet ball milling process of a mixture in which a weight ratio of carbon powder:sulfur is 10:90. A slurry was prepared by adding a composition of the carbon-sulfur composite 75.0 mass %: Super-P (conductive material) 20.0 mass %: a binder 5.0 mass % to water as a solvent, and then coated on an aluminum current collector having a thickness of about 20 µm to prepare a cathode having a loading amount of 2.0 mAh/cm$^2$.

[4. Manufacture of Lithium-Sulfur Secondary Battery]

The cathode prepared according to the method of the present application was used, a lithium foil having a thickness of about 150 µm was used as an anode, and a polyolefin membrane (Celgard® 2400) was used as a separation membrane. An electrolyte mixing TEGDME (Tetraethylene glycol dimethyl ether), DOL (1,3-dioxolane) and DME (dimethoxyethane), where 1M LiN(CF$_3$SO$_2$)$_2$) and 0.1M LiNO$_3$ were dissolved, was used as the electrolyte to complete the manufacture of a lithium-sulfur secondary battery.

[5. Evaluation of Cycle Characteristics]
Instrument: Charger-discharger of 100 mA class
Charge: 0.1 C, constant current/constant voltage mode
Discharge: 0.1 C, constant current mode (1.5V)
Cycle temperature: 25° C.

[Resin Production Example 1]—Production of Acrylic Binder (A1)

In a 250 mL round bottom flask, 7.5 g of polyethyleneoxide methylether methacrylate, 6.0 g of N-vinyl-2-pyrrolidone, 1.5 g of acrylonitrile and 60 g of water were charged and the inlet was sealed. Oxygen was removed through nitrogen bubbling for 30 minutes, the reaction flask was immersed in an oil bath heated to 60° C., and then 0.03 g of V-50 (Wako Chemical) was added to initiate the reaction. In 24 hours when the monomer conversion was 87%, the reaction was terminated to obtain an acrylic binder having a weight average molecular weight of about 300,000.

[Resin Production Examples 2 to 4]—Production of Acrylic Binders (A2, A3, A4)

An acrylic binder was prepared in the same manner as in Production Example 1, except that the kinds and contents of the monomers used upon the polymerization were adjusted as in Table 1 below.

TABLE 1

|  | A1 | A2 | A3 | A4 |
|---|---|---|---|---|
| PEOMA (part by weight) | 50 | 50 | 50 | 50 |
| VP (part by weight) | 40 |  | 25 | 40 |
| DMAA (part by weight) |  | 40 | 25 |  |
| AN (part by weight) | 10 | 10 |  |  |
| MMA (part by weight) |  |  |  | 10 |
| Mw | 300,000 | 350,000 | 500,000 | 400,000 |

PEOMA: Poly(ethylene oxide) methyl ether methacrylate
VP: N-vinyl-2-pyrrolidone
DMAA: N,N-dimethylacrylamide
AN: acrylonitrile
MMA: Methyl methacrylate

[Example 1]—Manufacture of Lithium-Sulfur Secondary Battery

A lithium-sulfur secondary battery was manufactured using a cathode having an active layer comprising an acrylic binder (A1) prepared according to Production Example 1 above. The charge/discharge was evaluated with 0.1 C/0.1 C by 50 cycles between 1.5 V and 2.8 V, and then the remaining capacity in the second cycle and the remaining capacity in the 50th cycle were calculated relative to the initial capacity to measure the capacity retention rate and the result was shown in Table 2.

[Examples 2 to 4]—Manufacture of Lithium-Sulfur Secondary Battery

A battery was manufactured in the same manner as in Example 1, except that a lithium-sulfur secondary battery was produced using a cathode having an active layer comprising each acrylic binder (A2, A3, A4) prepared according to Production Examples 2 to 4, and the capacity retention rate was evaluated and shown in Table 2.

[Comparative Examples 1 and 2]—Manufacture of Lithium-Sulfur Secondary Battery

A battery was manufactured in the same manner as in Example 1, except that a polyvinylidene fluoride (PVDF) binder or a mixture of styrene-butadiene rubber (SBR) and carboxymethyl cellulose (CMC) in a ratio of 1:1 was used as a cathode binder instead of acrylic binders (A1, A2, A3, A4), and the capacity retention rate was evaluated and shown in Table 2.

TABLE 2

|  | Example | | | | Comparative Example | |
|---|---|---|---|---|---|---|
|  | 1 | 2 | 3 | 4 | 1 | 2 |
| Binder | A1 | A2 | A3 | A3 | PVDF | SBR + CMC |
| Capacity retention rate (%) | 86 | 85 | 88 | 88 | 75 | 80 |

As shown in Table 2, in the case of the lithium-sulfur secondary battery according to Examples, the phenomenon that the sulfur was dissoluted into the electrolyte could be inhibited by comprising the acrylic binder containing the polymerized units of the polymerizable monomer having the polar functional group interacting with sulfur, which is the cathode active material, in the active layer, and thus it was shown that the capacity retention ratio according to the cycle progress was high.

INDUSTRIAL APPLICABILITY

The present application can provide an acrylic binder contained in a cathode active layer of a lithium-sulfur secondary battery, which can effectively prevent dissolution of a cathode active material and ultimately ensure excellent cycle characteristics, and a composition comprising the same.

Also, the present application can provide a composition for forming a cathode active layer of a lithium-sulfur secondary battery, which can comprise an appropriate amount of a conductive material by having excellent dispersion characteristics, and a cathode comprising the active layer formed therefrom.

The invention claimed is:

1. An acrylic binder for a lithium-sulfur secondary battery cathode, comprising a polymerized units of a polymerizable monomer having a polar functional group interacting with a cathode active material,
    wherein the polar functional group comprises an alkylene oxide group, and optionally further comprises at least one selected from the group consisting of a nitrogen-containing functional group, a hydroxy group and an alkoxysilyl group.

2. The acrylic binder for a lithium-sulfur secondary battery cathode according to claim 1,
    wherein the polymerizable monomer having a polar functional group is contained in the polymerized unit in an amount of 30 to 100 parts by weight.

3. The acrylic binder for a lithium-sulfur secondary battery cathode according to claim 1,
    further comprising a polymerized unit of alkyl (meth) acrylate.

4. The acrylic binder for a lithium-sulfur secondary battery cathode according to claim 3,
    wherein the alkyl (meth)acrylate is contained in the polymerized unit in an amount of 5 to 30 parts by weight.

5. The acrylic binder for a lithium-sulfur secondary battery cathode according to claim 1,
    having a particle diameter of 10 nm or less.

6. The acrylic binder for a lithium-sulfur secondary battery cathode according to claim 1,
    having a glass transition temperature in a range of −80° C. to 50° C.

7. The acrylic binder for a lithium-sulfur secondary battery cathode according to claim 1,
    having a weight average molecular weight in a range of 5,000 to 3,000,000.

8. A composition for forming a cathode active layer of a lithium-sulfur secondary battery comprising the acrylic binder according to claim 1, a cathode active material and a conductive material.

9. The composition for forming a cathode active layer of a lithium-sulfur secondary battery according to claim 8, wherein the acrylic binder is contained in an amount of 0.01 to 10 parts by weight, relative to 100 parts by weight of a solid content of the composition.

10. The composition for forming a cathode active layer of a lithium-sulfur secondary battery according to claim 8, wherein the cathode active material is a sulfur-carbon composite.

11. The composition for forming a cathode active layer of a lithium-sulfur secondary battery according to claim 8, wherein the cathode active material is contained in an amount of 30 to 95 parts by weight, relative to 100 parts by weight of a solid content of the composition.

12. The composition for forming a cathode active layer of a lithium-sulfur secondary battery according to claim 8, further comprising a non-acrylic binder.

13. The composition for forming a cathode active layer of a lithium-sulfur secondary battery according to claim 8, wherein the conductive material is contained in an amount of 2 to 70 parts by weight, relative to 100 parts by weight of a solid content of the composition.

14. A cathode for a lithium-sulfur secondary battery having:
a current collector; and
an active layer formed on the current collector and comprising the acrylic binder according to claim 1.

15. The cathode for a lithium-sulfur secondary battery according to claim 14, wherein the active layer has a thickness in a range of 1 to 200 μm.

16. A lithium-sulfur secondary battery comprising the cathode of claim 14.

17. The cathode for a lithium-sulfur secondary battery according to claim 14, wherein a cathode active material has a compound comprising a sulfur element.

18. The cathode for a lithium-sulfur secondary battery according to claim 17, wherein the cathode active material is a sulfur-carbon composite.

19. The cathode for a lithium-sulfur secondary battery according to claim 17, wherein the polar functional group of the acrylic binder interacts with the sulfur element.

* * * * *